(12) United States Patent
Bailey

(10) Patent No.: US 6,484,703 B1
(45) Date of Patent: Nov. 26, 2002

(54) EGR/BLEED AIR DIVERTER VALVE

(75) Inventor: Brett M. Bailey, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 49 days.

(21) Appl. No.: 09/850,941

(22) Filed: May 8, 2001

(51) Int. Cl.[7] ............................................. F02M 25/07
(52) U.S. Cl. ................... 123/568.15; 60/605.2
(58) Field of Search .................. 123/568.15, 568.18, 123/568.21; 60/605.2, 602

(56) References Cited

U.S. PATENT DOCUMENTS

| | | | |
|---|---|---|---|
| 3,645,098 A | | 2/1972 | Templin et al. |
| 3,776,207 A | | 12/1973 | Simko |
| 3,980,064 A | | 9/1976 | Ariga et al. |
| 4,047,509 A | * | 9/1977 | Arnaud .................. 123/568.15 |
| 5,440,880 A | | 8/1995 | Ceynow et al. |
| 5,517,976 A | | 5/1996 | Bachle et al. |
| 5,611,204 A | * | 3/1997 | Radovanovic et al. ...... 123/574 |
| 5,669,365 A | | 9/1997 | Gartner et al. |
| 5,740,785 A | | 4/1998 | Dickey et al. |
| 5,740,786 A | | 4/1998 | Gartner |
| 5,794,445 A | | 8/1998 | Dungner |
| 5,802,846 A | | 9/1998 | Bailey |
| 6,000,222 A | | 12/1999 | Regnier |
| 6,003,315 A | * | 12/1999 | Bailey ........................ 60/605.2 |
| 6,009,709 A | | 1/2000 | Bailey |
| 6,237,336 B1 | * | 5/2001 | Feucht et al. .......... 123/568.17 |
| 6,408,833 B1 | * | 6/2002 | Faletti .................... 123/568.17 |

* cited by examiner

*Primary Examiner*—Willis R. Wolfe
*Assistant Examiner*—Mahmoud Gimie

(57) ABSTRACT

A valve for use in an EGR system for an internal combustion engine has a housing having an exhaust inlet, an EGR outlet, an exhaust outlet and a bleed air inlet. A butterfly plate is pivotally connected to the housing. The butterfly plate has at least a first position and a second position, wherein the first position defines a first fluid path between the exhaust inlet and the EGR outlet and defines a second fluid path between the bleed air inlet and the exhaust outlet, and wherein the second position defines a third fluid path between the exhaust inlet and the exhaust outlet and defines a fourth fluid path between the bleed air inlet and the EGR outlet.

13 Claims, 2 Drawing Sheets

EGR/BLEED AIR DIVERTER VALVE

TECHNICAL FIELD

This invention relates generally to an internal combustion engine and, more particularly, to an EGR/bleed air diverter valve.

BACKGROUND ART

An exhaust gas recirculation (EGR) system is used for controlling the generation of undesirable pollutant gases and particulate matter in the operation of internal combustion engines. Such systems have proven particularly useful in internal combustion engines used in motor vehicles such as passenger cars, light duty trucks, and other on-road motor equipment. EGR systems primarily recirculate the exhaust gas by-products into the intake air supply of the internal combustion engine. The exhaust gas that is introduced to the engine cylinder reduces the concentration of oxygen therein, which in turn lowers the maximum combustion temperature within the cylinder and slows the chemical reaction of the combustion process, thereby decreasing the formation of nitrous oxides (NOx). Furthermore, the exhaust gases typically contain unburned hydrocarbons, which are burned on reintroduction into the engine cylinder, which further reduces the emission of exhaust gas by-products which would be emitted as undesirable pollutants from the internal combustion engine.

In many EGR applications, the exhaust gas is diverted by an EGR valve directly from the exhaust manifold. The percentage of the total exhaust flow which is diverted for reintroduction into the intake manifold of an internal combustion engine is known as the EGR flow rate of the engine.

Some internal combustion engines include turbochargers to increase engine performance, and are available in a variety of configurations. For example, fixed housing turbochargers have a fixed exhaust inlet nozzle that accelerates exhaust gas towards a turbine wheel, which in turn rotates a compressor. Also, a variable nozzle turbocharger (VNT) has a variable nozzle having a ring of a plurality of variable vanes which are controlled to change the cross sectional area through which the exhaust gases pass to reach the turbine. In a VNT, the smaller the nozzle opening, the faster the gas velocity to the turbine, and in turn, the higher the boost. Still further, it is known to provide a turbocharger having two independent compressors, which is known as a double sided compressor.

When utilizing EGR in a turbocharged diesel engine, the exhaust gas to be recirculated is often removed upstream of the exhaust gas driven turbine associated with the turbocharger. The recirculated exhaust gas is typically introduced to the intake air stream downstream of the compressor and air-to-air after-cooler (ATAAC). Reintroducing the exhaust gas downstream of the compressor and ATAAC is preferred in some systems due to the reliability and maintainability concerns that arise if the exhaust gas passes through the compressor and ATAAC.

The ability to supply EGR gases into the intake manifold and/or fresh air into the exhaust manifold is a difficult task, considering the high temperatures, exhaust corrosion and abrasion, sealing needs, actuators and packaging constraints of prior EGR systems. For example, U.S. Pat. No. 5,440,880 discloses a diesel engine EGR system having a flow diverter valve positioned immediately downstream of an EGR valve. The flow diverter valve is controlled to modulate the portion of exhaust gas that is directed to an after-cooler to be cooled prior to introduction into the intake manifold, or directs exhaust gas directly to the intake manifold. The exhaust gas that is directed to the after-cooler is first conditioned by an exhaust gas conditioner to remove soot so as to optimize the efficiency of the after-cooler.

At high speed and load, the pressure in the intake manifold will be higher than that of the exhaust manifold. If a passageway is opened between the intake and exhaust manifold under these conditions, fresh air will flood into the exhaust manifold, thereby significantly decreasing the engine performance.

The present invention is directed to overcoming one or more of the problems or disadvantages associated with the prior art.

DISCLOSURE OF THE INVENTION

In one aspect of the invention, a valve is provided for use in an EGR system for an internal combustion engine. The valve has a housing having an exhaust inlet, an EGR outlet, an exhaust outlet and a bleed air inlet. A butterfly plate is pivotally connected to the housing. The butterfly plate has at least a first position and a second position, wherein the first position defines a first fluid path between the exhaust inlet and the EGR outlet and defines a second fluid path between the bleed air inlet and the exhaust outlet, and wherein the second position defines a third fluid path between the exhaust inlet and the exhaust outlet and defines a fourth fluid path between the bleed air inlet and the EGR outlet.

In another aspect of the invention, provided is an internal combustion engine, comprising a block defining a plurality of combustion cylinders, the plurality of combustion cylinders having a first group of combustion cylinders and at least one EGR pumping cylinder. An intake manifold is connected to the block for providing combustion air to each of the plurality of combustion cylinders. A first exhaust manifold is connected to the block to receive combustion gases from the first group of combustion cylinders. A second exhaust manifold is connected to the block to receive combustion gases from the at least one EGR pumping cylinder. A turbocharger has a turbine and a compressor. The turbine has an exhaust gas inlet port and an exhaust gas outlet port, the exhaust gas inlet port of the turbine being coupled for fluid communication with at least one of the first exhaust manifold and the second exhaust manifold. A compressed air conduit is coupled to provide fluid communication between a compressed air outlet port of the compressor and the intake manifold. The compressed air conduit has a bleed air port. A valve is provided having a housing and a valve mechanism. The housing has an exhaust inlet, an EGR outlet, an exhaust outlet and a bleed air inlet, the exhaust inlet being connected in fluid communication with the second exhaust manifold, the EGR outlet being connected in fluid communication with the intake manifold, the exhaust outlet being connected in fluid communication with the first exhaust manifold, and the bleed air inlet being connected in fluid communication with the bleed air port of the compressed air conduit. The valve mechanism has at least a first position and a second position. The first position defines a first fluid path between the exhaust inlet and the EGR outlet and defines a second fluid path between the bleed air inlet and the exhaust outlet. The second position defines a third fluid path between the exhaust inlet and the exhaust outlet and defines a fourth fluid path between the bleed air inlet and the EGR outlet.

In still another aspect of the invention, provided is a method of providing EGR for an internal combustion engine, comprising the steps of providing a single valve having a housing and a valve mechanism, the housing having an exhaust inlet, an EGR outlet, an exhaust outlet and a bleed air inlet; positioning the valve mechanism in a first position to define a first fluid path between the exhaust inlet and the EGR outlet and to define a second fluid path between the bleed air inlet and the exhaust outlet; positioning the valve mechanism in a second position to define a third fluid path between the exhaust inlet and the exhaust outlet and to define a fourth fluid path between the bleed air inlet and the EGR outlet; and positioning the valve mechanism between the first position and the second position to simultaneously control an amount of EGR gases and an amount of compressed bleed air supplied in the internal combustion engine.

BEST MODE FOR CARRYING OUT THE INVENTION

Figure 1:
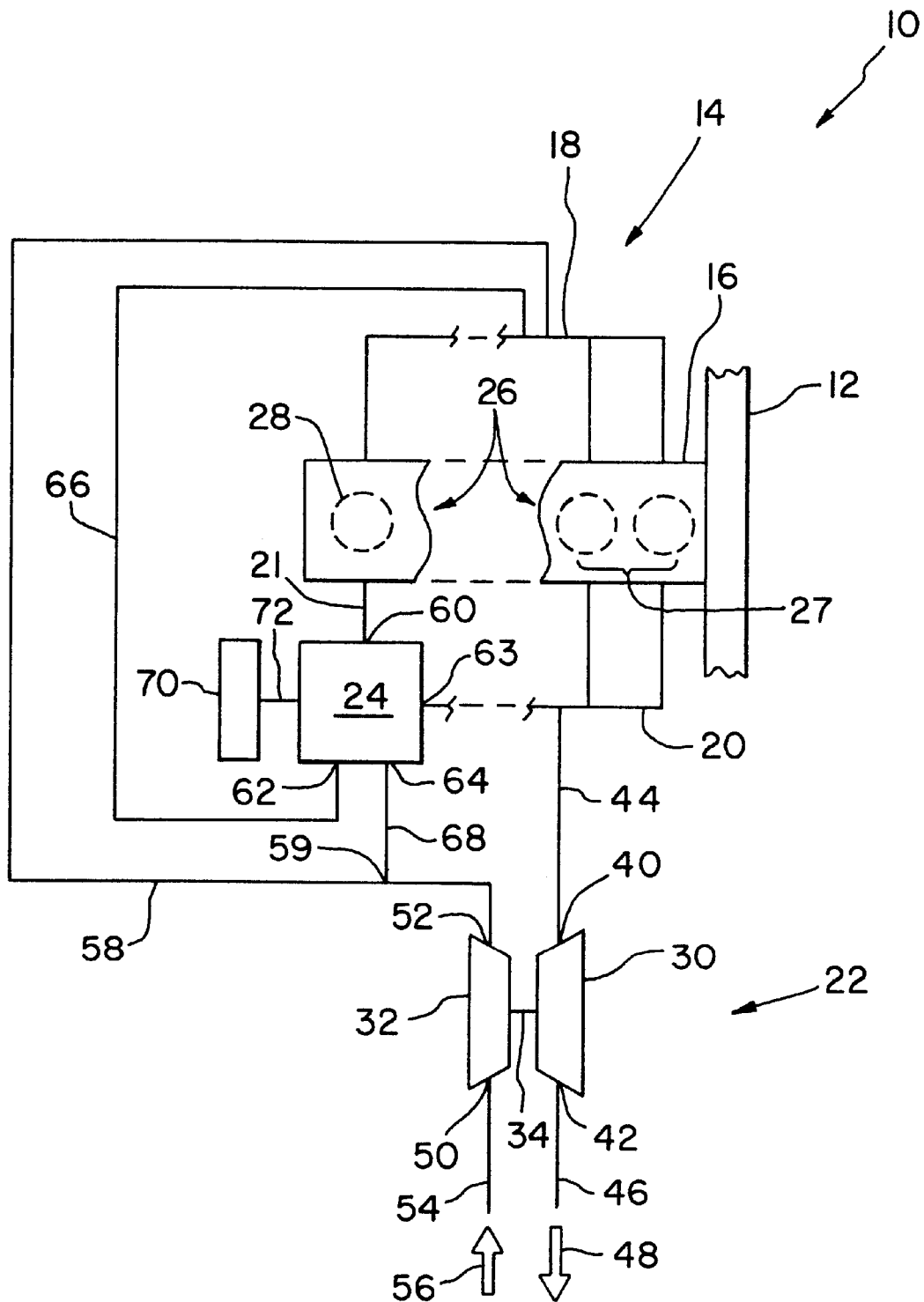
FIG. 1 is a graphical illustration of an engine emission control system of the invention.

Referring the drawings, there is shown in FIG. 1 a work machine 10 having a frame 12 to which an internal combustion engine 14 is attached. Internal combustion engine 14 includes a block 16, an intake manifold 18, a first exhaust manifold 20, a second exhaust manifold 21, a turbocharger 22, and an EGR/bleed air diverter valve 24.

As used herein, block 16 includes both an engine block and cylinder head. Block 16 of internal combustion engine 14 includes a plurality of combustion cylinders 26 (shown schematically by dashed circles), and a corresponding plurality of reciprocating pistons (not shown), each coupled to a crankshaft by a connecting rod (not shown). The plurality of combustion cylinders 26 includes a first group of combustion cylinders 27 and at least one EGR pumping cylinder 28, such as for example a sixth cylinder in a six cylinder engine, which is used to supply EGR gases. The general operation of the components included in block 16 is well known in the art, and for the sake of brevity, will not be further discussed herein.

Intake manifold 18 is connected to block 16 to supply combustion air to combustion cylinders 26. The combustion air includes both fresh air supplied from turbocharger 22 and EGR gases supplied from EGR/bleed air diverter valve 24.

Each of first exhaust manifold 20 and second exhaust manifold 21 is connected in fluid communication with block 16 to receive combustion gases (also know as exhaust gases) from combustion cylinders 26 following the combustion of an air/fuel mixture in combustion cylinders 26. In particular, second exhaust manifold 21 is coupled in fluid communication with EGR pumping cylinder 28. As an alternative, first and second exhaust manifolds 20, 21 can be arranged to form a unitary manifold bank.

Turbocharger 22 includes a turbine 30 and a compressor 32. Turbine 30 and compressor 32 are connected for mutual rotation via a shaft 34.

Turbine 30 has an exhaust gas inlet port 40 and an exhaust gas outlet port 42. Exhaust gas inlet port 40 of turbine 30 is coupled in fluid communication to exhaust manifold 20 via exhaust conduit 44. Exhaust gas outlet port 42 is coupled in fluid communication with the atmosphere via an exhaust pipe 46 to expel exhaust gases, depicted by arrow 48.

Compressor 32 has an air inlet port 50, and a compressed air outlet port 52. Air inlet port 50 is connected in fluid communication with the atmosphere via a conduit 54 to receive atmospheric air, depicted by arrow 56, for combustion. Compressed air outlet port 52 is coupled in fluid communication with intake manifold 18 via compressed air conduit 58. Compressed air conduit 58 has a bleed air port 59.

EGR/bleed air diverter valve 24 has an exhaust inlet 60, an EGR outlet 62, an exhaust outlet 63 and a bleed air inlet 64. Exhaust inlet 60 is coupled in fluid communication with second exhaust manifold 21. ERG outlet 62 is coupled in fluid communication with intake manifold 18 via a conduit 66. Exhaust outlet 63 is connected in fluid communication with first exhaust manifold 20. Bleed air inlet 64 is coupled to bleed port 59 of compressed air conduit 58 via a bleed line 68.

A valve controller 70 is coupled to EGR/bleed air diverter valve 24 via an actuator 72, such as a rod or shaft.

Figure 2:
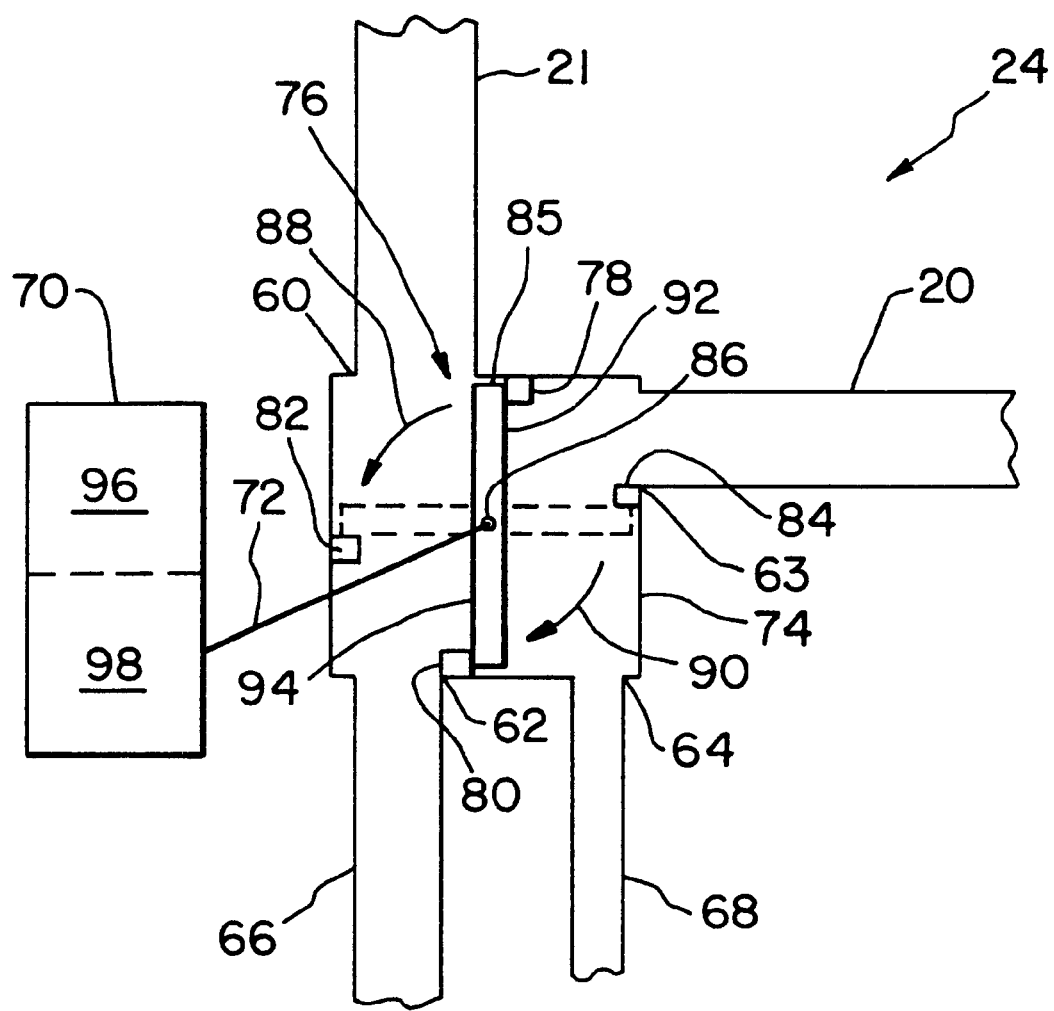
FIG. 2 is a graphical illustration of an EGR/bleed air diverter valve of the invention.

As shown in FIG. 2, EGR/bleed air diverter valve 24 includes a housing 74, a valve mechanism 76 and seal stops 78, 80, 82 and 84. As shown, valve mechanism 76 has a butterfly plate 85 and a pivot shaft 86, with butterfly plate 85 being connected to pivot shaft 86. Pivot shaft 86 is rotatably coupled to housing 74 via apertures (not shown) formed in housing 74 for rotation in either of a first direction, depicted by an arrow 88, and a second direction, depicted by an arrow 90. Butterfly plate 85 has a first side surface 92 and a second side surface 94.

Internal sealing in EGR/bleed air diverter valve 24 is accomplished through tight tolerances of metal-to-metal contact between butterfly plate 85 and seal stops 78, 80, 82, 84 of housing 74, and between pivot shaft 86 and the apertures in housing 74 that pivotally support pivot shaft 86. Seal stops 78, 80, 82, 84 may be machined into housing 74. As an alternative, the seal stops 78, 80, 82 and 84 could be made of a material other than metal, such as a ceramic material. As shown in FIG. 2, seal stops 78 and 84 are located to contact first side surface 92, at opposing ends of butterfly plate 85. Seal stops 80 and 82 are located to contact second side surface 94, at opposing ends of butterfly plate 85.

Valve controller 70 has a control unit 96 and an actuator unit 98. Actuator unit 98 is coupled to pivot shaft 86 via actuator 72. In a simple form thereof, valve controller 70 may be a sensor and actuator arrangement. In a more complex form thereof, control unit 96 may have an electronic logic module, or microprocessor system, in electrical communication with one or more sensors, such as sensors for monitoring $CO_2$ and/or $NO_x$ content of exhaust gases, EGR flow rate, engine speed, exhaust gas temperature and altitude, and in electrical or mechanical communication with actuator unit 98. Actuator unit 98, for example, may have an electrical solenoid, gear train and/or linkage system.

INDUSTRIAL APPLICABILITY

During operation, intake manifold 18 provides combustion air to each of the plurality of combustion cylinders 26. First exhaust manifold 20 receives combustion gases from the group of combustion cylinders 27. Second exhaust manifold 21 receives combustion gases from EGR pumping cylinder 28. Exhaust gases from at least one of first exhaust manifold 20 and second exhaust manifold 21 are received by turbocharger 22, thereby causing rotation of turbine 30, which in turn rotates compressor 32. Compressor 32 receives atmospheric air 56 via air inlet port 50 and supplies a flow of compressed air via compressed air outlet port 52. The flow of compressed air is routed by compressed air conduit 58 to intake manifold 18, except for the compressed bleed air which flows through bleed air port 59.

EGR/bleed air diverter valve 24 is controlled to define multiple positions of valve mechanism 76, including butterfly plate 85.

When butterfly plate 85 is in a first position, as shown by solid lines in FIG. 2, a first fluid path is defined between exhaust inlet 60 and EGR outlet 62, and a second fluid path is defined between bleed air inlet 64 and exhaust outlet 63. When butterfly plate 85 is positioned in the first position, butterfly plate 85 contacts first seal stop 78 and second seal stop 80, and does not contact third seal stop 82 and fourth seal stop 84. Also, referring to FIGS. 1 and 2, in the first position a full flow of exhaust gases is supplied from EGR pumping cylinder 28 to intake manifold 18, and a full flow of compressed bleed air is supplied from bleed air port 59 of compressed air conduit 58 to first exhaust manifold 20. Thus, the first position permits internal combustion engine 14 to operate with a full EGR flow (100 percent) from EGR pumping cylinder 28 to intake manifold 18, and with full bleed air flow (100 percent) to first exhaust manifold 20.

When butterfly plate 85 is in a second position, shown by dashed lines in FIG. 2, a third fluid path is defined between exhaust inlet 60 and exhaust outlet 63, and a fourth fluid path is defined between bleed air inlet 64 and EGR outlet 62. When butterfly plate 85 is positioned in the second position, butterfly plate 85 contacts third seal stop 82 and fourth seal stop 84, and does not contact first seal stop 78 and second seal stop 80. Also, referring to FIGS. 1 and 2, in the second position a full flow of exhaust gases is supplied from EGR pumping cylinder 28 to first exhaust manifold 20, and a full flow of compressed bleed air is supplied from bleed air port 59 of compressed air conduit 58 to intake manifold 18. Thus, the second position permits internal combustion engine 14 to operate with no EGR flow (0 percent) to intake manifold 18 and with no bleed air flow (0 percent) to exhaust manifold 20.

Butterfly plate 85 is variably positionable between the first position (as depicted by solid lines) and the second position (depicted by dashed lines) to simultaneously control an amount and/or flow rate of EGR gases between 0 and 100 percent supplied to intake manifold 18 and an amount and/or flow rate of compressed bleed air between 0 and 100 percent supplied to first exhaust manifold 20.

Thus, as shown in FIG. 2, it is apparent that EGR/bleed air diverter valve 24 is designed so that an increase or decrease in the amount and/or flow rate of EGR gases to intake manifold 18 resulting from a change in position of valve mechanism 76 results in a corresponding increase or decrease, respectively, in the amount and/or flow rate of compressed bleed air supplied to first exhaust manifold 20.

The metal-to-metal seal design of EGR/bleed air diverter valve 24 is effected such that seal stops 78, 80, 82 and 84 contact respective side surfaces 92, 94 of butterfly plate 85. This permits butterfly plate 85 to have a different thermal expansion than housing 74 without seizing.

As shown in FIG. 2, actuator unit 98 of valve controller 70 is coupled to pivot shaft 86 of valve mechanism 76 via actuator 72 to effect the rotation thereof in a pivoting manner at the directive of control unit 96. The commanded pivoting of shaft 86 variably positions butterfly plate at any position from the above-mentioned first position through the above-mentioned second position. Accordingly, EGR/bleed air diverter valve 24 provides simultaneous control of an amount and/or flow rate of EGR gases supplied to intake manifold 18 of internal combustion engine 14 and an amount and/or flow rate of compressed bleed air supplied to exhaust manifold 20 of internal combustion engine 14, using a simple single valve design.

The use of a single valve to control both EGR and bleed air paths advantageously reduces system costs by reducing the number of valves, actuators and actuator drivers. The compact design of the valve of the present invention permits the integration of the valve into or near the exhaust manifold which reduces the overall volume of the exhaust manifold and provides for good engine response.

Other aspects and features of the present invention can be obtained from study of the drawings, the disclosure, and the appended claims.

What is claimed is:

1. A valve for use in an EGR system for an internal combustion engine, comprising:
   a housing, said housing having an exhaust inlet, an EGR outlet, an exhaust outlet and a bleed air inlet;
   a pivot shaft pivotally coupled to said housing; and
   a butterfly plate connected to said pivot shaft, said butterfly plate having at least a first position and a second position, wherein said first position defines a first fluid path between said exhaust inlet and said EGR outlet and defines a second fluid path between said bleed air inlet and said exhaust outlet, and wherein said second position defines a third fluid path between said exhaust inlet and said exhaust outlet and defines a fourth fluid path between said bleed air inlet and said EGR outlet.

2. The valve of claim 1, wherein said butterfly plate is variably positionable between said first position and said second position to simultaneously control an EGR gases fluid flow rate and a compressed bleed air fluid flow rate.

3. The valve of claim 1, wherein said valve includes a first seal stop, a second seal stop, a third seal stop and a fourth seal stop, wherein when said butterfly plate is positioned in said first position, said butterfly plate contacts said first seal stop and said second seal stop, and does not contact said third seal stop and said fourth seal stop, and when said butterfly plate is positioned in said second position, said butterfly plate contacts said third seal stop and said fourth seal stop, and does not contact said first seal stop and said second seal stop.

4. The valve of claim 3, wherein each of said first seal stop, said second seal stop, said third seal stop and said fourth seal stop is made of metal.

5. The valve of claim 3, wherein each of said first seal stop, said second seal stop, said third seal stop and said fourth seal stop contacts a respective one of a first side surface and a second side surface of said butterfly plate.

6. An internal combustion engine, comprising:
   a block defining a plurality of combustion cylinders, said plurality of combustion cylinders having a first group of combustion cylinders and at least one EGR pumping cylinder;
   an intake manifold connected to said block for providing combustion air to each of said plurality of combustion cylinders;
   a first exhaust manifold connected to said block to receive combustion gases from said first group of combustion cylinders;
   a second exhaust manifold connected to said block to receive combustion gases from said at least one EGR pumping cylinder;
   a turbocharger having a turbine and a compressor, said turbine having an exhaust gas inlet port and an exhaust gas outlet port, said exhaust gas inlet port of said turbine being coupled for fluid communication with at least one of said first exhaust manifold and said second exhaust manifold, said compressor having an air inlet port and a compressed air outlet port, said air inlet port of said compressor being in fluid communication with the atmosphere;

a compressed air conduit coupled to provide fluid communication between said compressed air outlet port and said intake manifold, said compressed air conduit having a bleed air port;

a valve having a housing and a valve mechanism, said housing having an exhaust inlet, an EGR outlet, an exhaust outlet and a bleed air inlet, said exhaust inlet being connected in fluid communication with said second exhaust manifold, said EGR outlet being connected in fluid communication with said intake manifold, said exhaust outlet being connected in fluid communication with said first exhaust manifold and said turbine, and said bleed air inlet being connected in fluid communication with said bleed air port of said compressed air conduit, said valve mechanism having at least a first position and a second position, wherein said first position defines a first fluid path between said exhaust inlet and said EGR outlet and defines a second fluid path between said bleed air inlet and said exhaust outlet, and wherein said second position defines a third fluid path between said exhaust inlet and said exhaust outlet and defines a fourth fluid path between said bleed air inlet and said EGR outlet.

7. The internal combustion engine of claim 6, wherein said valve mechanism has a butterfly plate connected to a pivot shaft, said pivot shaft being pivotally coupled to said housing.

8. The internal combustion engine of claim 7, wherein said butterfly plate is variably positionable between said first position and said second position to simultaneously control an amount of EGR gases supplied to said intake manifold and an amount of compressed bleed air supplied to said first exhaust manifold.

9. The internal combustion engine of claim 7, wherein said valve includes a first seal stop, a second seal stop, a third seal stop and a fourth seal stop, wherein when said butterfly plate is positioned in said first position, said butterfly plate contacts said first seal stop and said second seal stop, and does not contact said third seal stop and said fourth seal stop, and when said butterfly plate is positioned in said second position, said butterfly plate contacts said third seal stop and said fourth seal stop, and does not contact said first seal stop and said second seal stop.

10. The internal combustion engine of claim 9, wherein each of said first seal stop, said second seal stop, said third seal stop and said fourth seal stop is made of metal.

11. The internal combustion engine of claim 9, wherein each of said first seal stop, said second seal stop, said third seal stop and said fourth seal stop contacts a respective one of a first side surface and a second side surface of said butterfly plate.

12. The internal combustion engine of claim 7, including a valve controller coupled to said pivot shaft.

13. A method of providing EGR for an internal combustion engine, comprising the steps of:

providing a single valve having a housing and a valve mechanism, said housing having an exhaust inlet, an EGR outlet, an exhaust outlet and a bleed air inlet;

positioning said valve mechanism in a first position to define a first fluid path between said exhaust inlet and said EGR outlet and to define a second fluid path between said bleed air inlet and said exhaust outlet;

positioning said valve mechanism in a second position to define a third fluid path between said exhaust inlet and said exhaust outlet and to define a fourth fluid path between said bleed air inlet and said EGR outlet; and positioning said valve mechanism between said first position and said second position to simultaneously control an amount of EGR gases supplied to an intake manifold of said internal combustion engine and an amount of compressed bleed air supplied to an exhaust manifold of said internal combustion engine.

\* \* \* \* \*